J. MEESE, Sr.
Bee Hive.
No. 27,004.
Patented Jan'y 31, 1860.
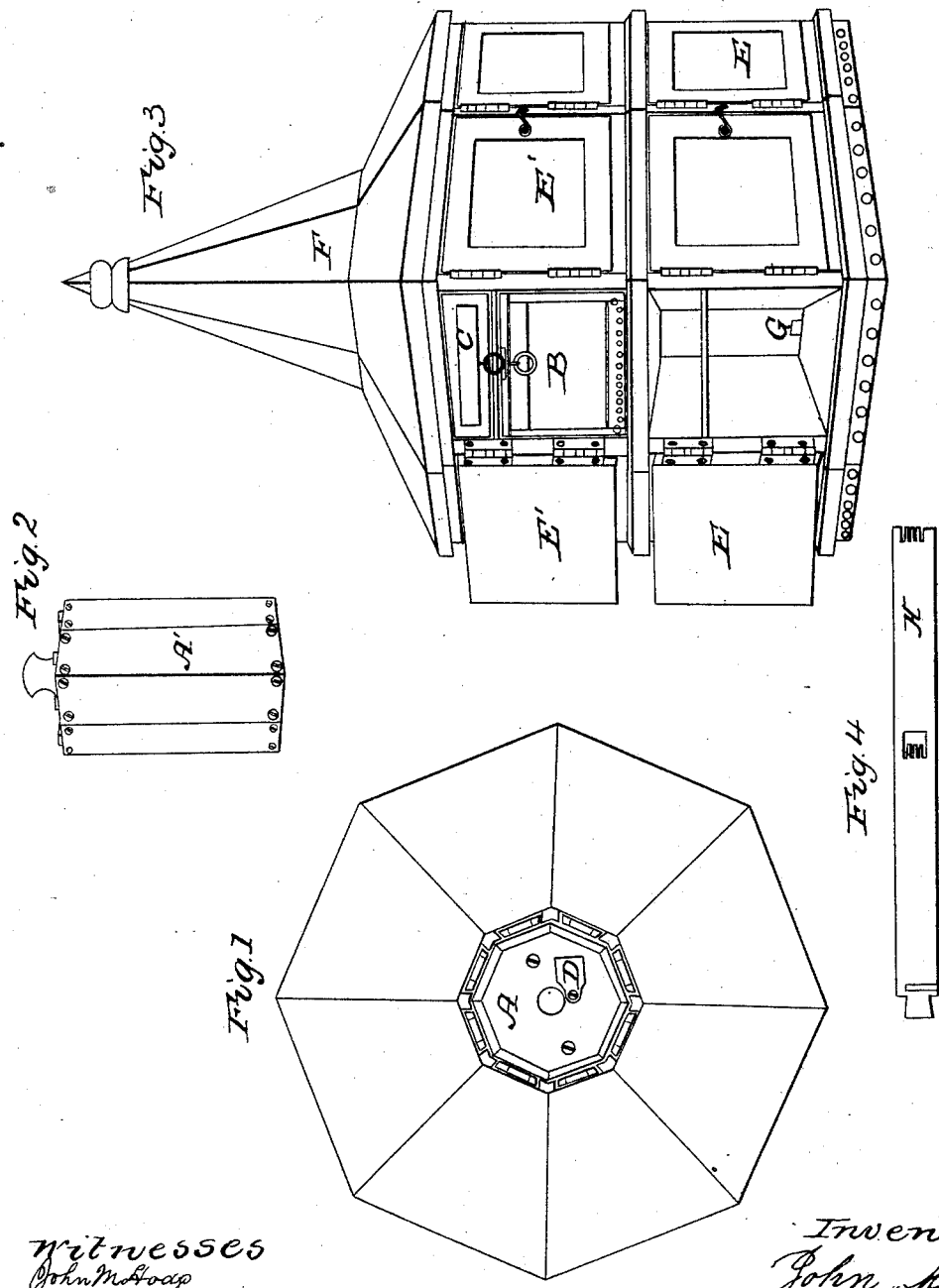

UNITED STATES PATENT OFFICE.

JOHN MEESE, SR., OF MILTON, OHIO.

BEEHIVE.

Specification of Letters Patent No. 27,004, dated January 31, 1860.

*To all whom it may concern:*

Be it known that I, JOHN MEESE, Sr., of Milton, in the county of Stark and State of Ohio, have invented a new and useful Improvement in Beehives; and I do hereby declare that the following is a full and exact description thereof, reference being had to the accompanying drawings and to the letters of reference marked thereon.

My invention consists in a new and useful construction of bee hives.

In the accompanying drawings, Figure 3, is a front view of my bee hive, with two doors swung open better to show the compartments. Fig. 1, is a top view of the same, the dome and one of the central chambers being removed in order to show the interior. Fig. 2, is a side elevation of one of the central chambers removed from the hive. Fig. 4, shows one of the slides detached from the hive.

My improved bee-hive has eighteen separate compartments, in addition to which there are sixteen extra honey-boxes. The hive is of octagon form, two stories high and crowned by a dome; it is therefore very beautiful as well as convenient. In the center of the hive are two compartments, A, A′, Figs. 1, and 2, for the parent stock of bees or for brood departments, and each of the eight facets embraces two honey chambers B, with two smaller honey boxes C. One of the central chambers A′, Fig. 2, stands directly above the other, A, Fig. 1. These chambers are both removable from the hive for inspection and may be emptied and cleaned whenever the brood comb becomes injured, requiring to be replaced by new comb. Between these two chambers is a door D, Fig. 1. The honey chambers B and honey boxes C are also removable, and are glazed in front to allow inspection. Each facet of the hive has two hinged doors, E and E′, Fig. 3. The dome F, is hinged, so as to tip one side like a tea-pot cover, to allow the removal of the brood chambers A, A′. In the bottom of the hive there is a central opening for cleaning the hive and for ventilation. The bees can enter the hive under each of the doors E and below the honey chambers B, then pass through bee doors G, Fig. 3 into the brood chambers. Eight slides, H, Fig. 4 are placed around the brood chambers to open or close the bee-doors G, at pleasure. These slides are fastened by buttons. Between the honey chambers B, and the honey boxes C are bee passages which are opened and closed at pleasure by slides s, Fig. 3. The bees may be first introduced to the lower brood chamber A and allowed to occupy a part of the lower honey chambers B. As the storing of honey progresses additional honey chambers may be opened so that the bees will not swarm. When the swarm has much increased the upper brood chamber A′ may be opened, and from time to time, more of the honey chambers B. At any time the upper brood chamber A may be removed to another hive if it is desired to divide the swarm, and an empty chamber A substituted, to be filled in like manner. The small honey boxes C and also the honey chambers B may be withdrawn for the removal of the honey whenever desired by shutting out the bees from the chambers or boxes to be emptied. By this construction of hive the too frequent swarming of the bees and their consequent loss may be prevented; yet the hive may be easily divided when such division is required. The bees can thus be conveniently and safely managed; every chamber and box can be inspected or removed at pleasure. The whole hive can be washed and the breeding department kept clean and healthy. The brood being in the center is less liable to suffer from cold. The beauty as well as convenience of this hive renders it a desirable ornament for the garden or grounds or even dwellings.

I am aware that chambered bee hives are not new, but I believe the construction of my hive is both new and useful.

Having thus fully described my invention, what I claim and desire to secure by Letters Patent of the United State is:

Providing the octagonal hive with the central octagonal brood chambers A and A′ arranged in relation to each other and to the slides H, and boxes B, C, in the manner described for the purpose specified.

JOHN MEESE, SR.

Witnesses:
JOHN M. HODGE,
W. S. HODGE.